US008883695B2

(12) United States Patent
Eoff et al.

(10) Patent No.: US 8,883,695 B2
(45) Date of Patent: Nov. 11, 2014

(54) PARTICULATE MATERIALS COATED WITH A RELATIVE PERMEABILITY MODIFIER AND METHODS FOR TREATING SUBTERRANEAN FORMATIONS USING TREATMENT FLUIDS CONTAINING THE SAME

(75) Inventors: Larry S. Eoff, Duncan, OK (US); Bradley L. Todd, Duncan, OK (US); David B. Allison, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 413 days.

(21) Appl. No.: 13/099,493

(22) Filed: May 3, 2011

(65) Prior Publication Data

US 2012/0279704 A1  Nov. 8, 2012

(51) Int. Cl.
*E21B 43/267* (2006.01)
*C09K 8/68* (2006.01)
*C09K 8/90* (2006.01)
*C09K 8/80* (2006.01)
*C09K 8/575* (2006.01)

(52) U.S. Cl.
CPC ............... *C09K 8/805* (2013.01); *C09K 8/5751* (2013.01); *C09K 8/68* (2013.01)
USPC ........... 507/219; 507/211; 507/213; 507/215; 507/217; 507/224; 507/225; 507/240

(58) Field of Classification Search
None
See application file for complete search history.

(56) References Cited

U.S. PATENT DOCUMENTS

| | | | |
|---|---|---|---|
| 3,743,018 A * | 7/1973 | Norton et al. .................. | 166/275 |
| 4,040,967 A * | 8/1977 | Nimerick et al. .............. | 507/211 |
| 4,042,529 A * | 8/1977 | Nimerick et al. .......... | 252/363.5 |
| 4,396,731 A * | 8/1983 | Dawans et al. ............... | 523/207 |
| 4,532,052 A | 7/1985 | Weaver et al. | |
| 5,566,760 A | 10/1996 | Harris | |
| 6,476,169 B1 | 11/2002 | Eoff et al. | |
| 6,547,871 B2 | 4/2003 | Chatterji et al. | |
| 6,605,570 B2 | 8/2003 | Miller et al. | |
| 7,063,151 B2 | 6/2006 | Nguyen et al. | |
| 7,081,439 B2 * | 7/2006 | Sullivan et al. ................ | 507/269 |
| 7,114,568 B2 | 10/2006 | Eoff et al. | |
| 7,159,659 B2 | 1/2007 | Welton et al. | |
| 7,216,711 B2 | 5/2007 | Nguyen et al. | |
| 7,299,874 B2 | 11/2007 | Welton et al. | |
| 7,303,019 B2 | 12/2007 | Welton et al. | |
| 7,445,044 B2 | 11/2008 | Walters et al. | |
| 7,547,665 B2 | 6/2009 | Welton et al. | |
| 7,584,791 B2 | 9/2009 | Robb et al. | |
| 7,595,282 B2 | 9/2009 | Pauls et al. | |
| 7,621,334 B2 | 11/2009 | Welton et al. | |
| 7,694,739 B2 | 4/2010 | Brothers et al. | |
| 7,717,180 B2 | 5/2010 | Badalamenti et al. | |
| 7,727,936 B2 | 6/2010 | Pauls et al. | |
| 7,727,937 B2 | 6/2010 | Pauls et al. | |
| 7,748,456 B2 | 7/2010 | Pauls et al. | |
| 7,799,744 B2 | 9/2010 | Welton et al. | |
| 7,814,980 B2 | 10/2010 | Bryant et al. | |
| 7,829,508 B2 | 11/2010 | Pauls et al. | |
| 7,846,877 B1 | 12/2010 | Robb | |
| 7,862,655 B2 | 1/2011 | Brothers et al. | |
| 7,885,944 B1 | 2/2011 | Bruening | |
| 2002/0169085 A1 | 11/2002 | Miller et al. | |
| 2005/0107503 A1 * | 5/2005 | Couillet et al. ............... | 524/249 |
| 2005/0199396 A1 | 9/2005 | Sierra et al. | |
| 2006/0124309 A1 | 6/2006 | Nguyen et al. | |
| 2006/0137875 A1 | 6/2006 | Dusterhoft et al. | |
| 2006/0183646 A1 | 8/2006 | Welton et al. | |
| 2006/0185848 A1 | 8/2006 | Surjaatmadja et al. | |
| 2008/0190609 A1 | 8/2008 | Robb et al. | |
| 2009/0095535 A1 | 4/2009 | Nguyen | |
| 2010/0216672 A1 | 8/2010 | Todd | |
| 2010/0307749 A1 | 12/2010 | Nguyen et al. | |
| 2011/0098377 A1 | 4/2011 | Huang et al. | |

FOREIGN PATENT DOCUMENTS

WO  WO 2008/096165 A1  8/2008
WO  WO 2009/125164 A1  10/2009

OTHER PUBLICATIONS

U.S. Appl. No. 12/956,569, filed Nov. 30, 2010.
U.S. Appl. No. 13/081,607, filed Apr. 7, 2011.
International Search Report and Written Opinion for PCT/GB2012/000315 dated Jun. 27, 2012.
International Search Report and Written Opinion for PCT/GB2012/000316 dated Jun. 27, 2012.

* cited by examiner

*Primary Examiner* — John J Figueroa
(74) *Attorney, Agent, or Firm* — McDermott Will & Emery LLP; Holly Soehnge

(57) ABSTRACT

Reduction of the water permeability within a subterranean formation, particularly within a proppant pack or a gravel pack, can be achieved through the use of a relative permeability modifier (RPM) coated on a particulate material. Methods for reducing the water permeability include providing RPM-coated particulates that contain a RPM coating on the particulates, and placing a treatment fluid containing a base fluid and the RPM-coated particulates in at least a portion of a subterranean formation. The treatment fluid can also contain a companion polymer that serves to further reduce the water permeability compared to that achievable when using the RPM alone.

22 Claims, No Drawings

PARTICULATE MATERIALS COATED WITH A RELATIVE PERMEABILITY MODIFIER AND METHODS FOR TREATING SUBTERRANEAN FORMATIONS USING TREATMENT FLUIDS CONTAINING THE SAME

BACKGROUND

The present invention relates to methods and compositions for reducing the water permeability within a subterranean formation, particularly within a proppant pack or a gravel pack, using a relative permeability modifier, and, more specifically, to methods and compositions for treating at least a portion of a subterranean formation using a relative permeability modifier coated on a particulate material.

The unwanted production of water, including brine, from hydrocarbon-producing wells constitutes a considerable technical problem and expense in oilfield operations. When a subterranean formation contains water in significant amounts, water's higher mobility often allows it to flow to the well bore by way of natural and manmade fractures and high permeability streaks. If the ratio of recovered water to recovered hydrocarbons becomes sufficiently large, the cost of separating the water from the hydrocarbons and disposing of it can become a barrier to continued production. This can lead to abandonment of a well penetrating a subterranean formation, even when significant amounts of hydrocarbons remain therein.

In order to reduce the undesired production of water from hydrocarbon-producing subterranean formations, aqueous-soluble polymer systems containing crosslinking agents have been used in the art to enter water-containing zones of the formation and block the flow of water therefrom. Selective placement of these crosslinked polymers in a subterranean formation and stability therein represent significant technical challenges that have somewhat limited their use. A more recent strategy to reduce water production from a subterranean formation has been to use agents known as relative permeability modifiers (RPMs). Such RPMs are capable of significantly reducing the flow of water within a subterranean formation while having a minimal effect on the flow of hydrocarbons. The use of RPMs does not generally necessitate the use of zonal isolation techniques that are often employed with crosslinked polymers.

While RPMs can overcome the necessity for selective placement in a subterranean formation, it may still prove advantageous to place RPMs in a desired zone of a subterranean formation in order to more efficiently focus their effects therein. For example, placement of a RPM directly in a water-producing zone of a subterranean formation can allow for more efficient use of the RPM where its effects are directly needed, rather than when it is dispersed throughout the formation, possibly in zones where it is not needed. More specifically, some formations such as, for example, shale formations, may require excessively large volumes of the RPM be used to fully contact the formation or to reach an effective RPM concentration in a target zone. When only a portion of the subterranean formation needs to have its water permeability reduced, this represents an inefficient use of the RPM. From an economic standpoint alone, it would be beneficial to more selectively place a RPM in a subterranean formation in order to reduce the amount of material needed for effective formation treatment.

SUMMARY OF THE INVENTION

The present invention relates to methods and compositions for reducing the water permeability within a subterranean formation, particularly within a proppant pack or a gravel pack, using a relative permeability modifier, and, more specifically, to methods and compositions for treating at least a portion of a subterranean formation using a relative permeability modifier coated on a particulate material.

In one embodiment, the present invention provides a method comprising: providing relative permeability modifier (RPM)-coated particulates that comprise a relative permeability modifier pre-coated on a particulate material; and placing a treatment fluid comprising a base fluid and the RPM-coated particulates in at least a portion of a subterranean formation.

In one embodiment, the present invention provides a method comprising: providing RPM-coated particulates that comprise a relative permeability modifier pre-coated on a particulate material; wherein the relative permeability modifier comprises a hydrophobically modified hydrophilic polymer; placing a treatment fluid comprising a base fluid, the RPM-coated particulates, and a companion polymer in at least a portion of a subterranean formation; and forming a proppant pack or a gravel pack within a fracture in the portion of the subterranean formation; wherein the treatment fluid is operable to reduce the water permeability of the proppant pack or the gravel pack by more than through using the relative permeability modifier alone.

In one embodiment, the present invention provides RPM-coated particulates comprising: a relative permeability modifier coating on a particulate material.

The features and advantages of the present invention will be readily apparent to one of ordinary skill in the art upon a reading of the description of the preferred embodiments that follows.

DETAILED DESCRIPTION

The present invention relates to methods and compositions for reducing the water permeability within a subterranean formation, particularly within a proppant pack or a gravel pack, using a relative permeability modifier, and, more specifically, to methods and compositions for treating at least a portion of a subterranean formation using a relative permeability modifier coated on a particulate material.

In general, the present invention describes pre-coating of relative permeability modifiers (RPMs) onto particulate materials and the use of such RPM-coated particulates in various subterranean operations for reducing water permeability. As used herein, particulate materials having RPMs pre-coated thereon will be referred to as "RPM-coated particulates." Coating of the RPM onto the particulate material can produce unexpected benefits that considerably facilitate the performance of certain subterranean operations, as discussed hereinafter. Subterranean operations in which the present RPM-coated particulates can be particularly useful include, for example, stimulation operations, production operations and remediation operations. More specifically, the present RPM-coated particulates can be particularly useful in fracturing operations, gravel packing operations or combined fracturing operations/gravel packing operations in which it is desirable to reduce the production of water from a subterranean formation. According to the present embodiments, reducing the production of water from a subterranean formation can be accomplished by reducing the water permeability of a proppant pack or a gravel pack within the subterranean formation.

One advantage of the RPM-coated particulates of the present invention is that the RPM coating thereon can be directed primarily into a desired zone or zones of a subterranean formation (e.g., within a fracture) using techniques known to one of ordinary skill in the art. Selective placement of the RPM-coated particulates can be particularly advantageous when the RPM-coated particulates are introduced into the subterranean formation in a treatment fluid. By selectively introducing the RPM-coated particulates into the subterranean formation, the targeted zone(s) can be more effectively treated with the RPM to reduce the water permeability. By contrast, when a RPM is introduced into a subterranean formation while dispersed in a treatment fluid, as is conventional in the art, localization of the RPM can be much less exact. Additionally, when a RPM is introduced in a fluid phase, considerably larger treatment fluid volumes can be necessary to effectively treat a desired zone of the subterranean formation, since undesired zones can also be contacted by the treatment fluid. In this regard, the RPM-coated particulates provide a more economical form of the RPM than does a conventional treatment fluid containing a comparable amount of RPM.

Although the RPM-coated particulates of the present invention can be selectively placed in a desired zone or zones of a subterranean formation, as described above, selective placement is by no means required. In this regard, the RPM-coated particulates described herein can be particularly advantageous in fracturing operations in a (potentially) water-containing subterranean formation. Specifically, it is usually not known with certainty when a water-containing zone will be encountered in a given fracturing operation. In conventional fracturing operations, it is necessary to add the RPM to the fracturing fluid in such cases to control potential water production. This represents an inefficient use of RPM from an economic, material, and environmental standpoint, as some portions of the subterranean formation may not be in need of water permeability reduction. In contrast, by using the RPM-coated particulates of the present invention, a much lower amount of RPM can be used in a given fracturing operation, thereby resulting in cost savings for the customer and producing a reduced environmental impact.

The RPM-coated particulates of the present invention are particularly advantageous when used in combination with a companion polymer in a treatment fluid. In the presence of an appropriate companion polymer, surprising benefits can be realized that can considerably enhance the activity of the RPM and simplify its introduction into a subterranean formation. These unexpected benefits can allow lower amounts of the RPM to be used when treating a subterranean formation, compared to a treatment operation conducted without the companion polymer being present. Specifically, when pre-coated on a suitable particulate material and contacted with a companion polymer in a treatment fluid, a RPM can produce a greater reduction in water permeability, particularly within a proppant pack or a gravel pack, compared to a like amount of RPM and companion polymer dispersed together in a treatment fluid.

In addition to the enhanced water permeability reduction, the coating of the RPM onto the particulate material can result in a beneficial stabilization of the treatment fluid itself. Specifically, certain RPMs such as, for example, some hydrophobically modified hydrophilic polymers, can precipitate from a treatment fluid under conditions of high pH and/or high temperatures. It is conventional in the art to use an aqueous salt base fluid to minimize the precipitation risk of hydrophobically modified hydrophilic polymers. However, by pre-coating the RPM onto a particulate material, the precipitation problem can be substantially avoided, thereby allowing a fresh water base fluid to be used for introducing the RPM-coated particulates into a subterranean formation, if desired. The ability to use a fresh water base fluid, as opposed to an aqueous salt base fluid, provides an increased operational simplicity and allows a further reduction in cost of goods when treating a subterranean formation.

Without being bound by theory or mechanism, it is believed that there is a synergistic interaction between the RPM and the companion polymer, particularly when the RPM is coated onto a particulate material such as, for example, sand. As noted above, benefits of such a synergistic interaction can include, but are not limited to, stabilization of treatment fluids containing fresh water base fluids and an enhanced propensity toward reduction of water permeability compared to using a RPM alone. Although synergistic interactions can be observed between a RPM and a companion polymer when both components are dispersed in a treatment fluid (see commonly owned U.S. patent application Ser. No. 13/081,607 filed on Apr. 7, 2011, which is incorporated herein by reference in its entirety), it is believed that the synergistic interactions can be at least as pronounced or even more pronounced when the RPM is coated onto a particulate material, as in the present embodiments. For example, in the presence of the companion polymer, equivalent amounts of RPM can give a greater water permeability reduction when coated on a particulate material than when dispersed in a treatment fluid. This is one way in which the presence of synergistic interactions between the RPM and the companion polymer can be ascertained.

Remaining free from any theory or mechanism, it is believed that synergistic interactions between the RPM and the companion polymer can result from a hydrogen bonding interaction or ionic association between suitable functional groups of the RPM and the companion polymer. When the RPM is coated onto a particulate material containing polar functionalities or ionic groups, such moieties can further enhance the synergistic interaction between the RPM and the companion polymer and improve any of the above-noted properties. Examples of polymer functional groups that are suitable for hydrogen bonding can include a neutral or protonated amine on a first polymer chain and a hydroxyl group or a carboxylate anion on a second polymer chain. Examples of polymer functional groups that are suitable for forming an ionic association can include quaternary ammonium ions on a first polymer chain and a carboxylate anion on a second polymer chain.

As defined herein, a "treatment fluid" is a fluid that is placed in a subterranean formation in order to achieve a desired purpose. Treatment fluids can be used in a variety of subterranean operations, including, but not limited to, stimulation operations, remedial operations, fracturing operations, and gravel packing operations. As used herein, the terms "treatment" and "treating" refer to any subterranean operation that uses a fluid in conjunction with performing a desired function and/or achieving a desired purpose. The terms "treatment" and "treating," as used herein, do not imply any particular action by the fluid or any particular component thereof unless otherwise specified. Treatment fluids can include, without limitation, fracturing fluids, acidizing fluids, conformance treatments, damage control fluids, remediation fluids, scale removal and inhibition fluids, and the like.

Treatment fluids of the present invention generally comprise an aqueous phase base fluid. Aqueous phase base fluids can include, for example, fresh water, acidified water, salt water, seawater, brine, or an aqueous salt solution. In some embodiments, the treatment fluids can also contain small amounts of hydrocarbons such that the aqueous base fluid remains as the continuous phase. Specifically, certain companion polymers described herein are obtained in a hydrocarbon base fluid. Inclusion of small amounts of hydrocarbons from the companion polymer source does not significantly impact the performance of the present treatment fluids.

In some embodiments, the base fluid comprises an aqueous salt solution. Such aqueous salt solutions can have a salt concentration ranging between about 0.1% and about 10% by weight. The salt concentration can range between about 1% and about 10% by weight in some embodiments or between about 2% and about 5% by weight in other embodiments. In some embodiments the aqueous salt solution can be 2% KCl.

In other embodiments, the base fluid can comprise fresh water. One of ordinary skill in the art will recognize that fresh water can be obtained from any available source including treated water sources (e.g., drinking water, reclaimed wastewater or desalinated water) or untreated water sources (e.g., streams, lakes or rivers). One of ordinary skill in the art will further recognize that fresh water sources can contain minor amounts of salts, biological materials and other substances that do not substantially affect its use as a base fluid in the present embodiments. In addition, since precipitation of the RPM is not a significant concern in the present embodiments, less control is needed over the composition of the base fluid. Accordingly, wastewater streams including, for example, industrial runoff streams and gray water can be used as the base fluid in the present embodiments.

In some embodiments, the present disclosure describes RPM-coated particulates that comprise a RPM coating on a particulate material. The RPM can be a hydrophobically modified hydrophilic polymer in an embodiment.

RPMs used in the present embodiments are generally hydrophobically modified hydrophilic polymers, which are described in more detail in commonly owned U.S. Pat. No. 6,476,169, which is incorporated herein by reference in its entirety. Hydrophobically modified hydrophilic polymers vary widely in structure, but generally comprise a hydrophilic polymer that has been at least partially chemically modified with hydrophobic groups (e.g., long chain alkyl groups having more than about 4 carbon atoms). In some embodiments, an existing hydrophilic polymer can be at least partially functionalized with a plurality of hydrophobic groups to produce a hydrophobically modified hydrophilic polymer. In other embodiments, a hydrophilic monomer unit functionalized with a hydrophobic group can be polymerized with itself or copolymerized with a hydrophilic monomer unit not containing hydrophobic functionalization to produce a hydrophobically modified hydrophilic polymer.

Hydrophobically modified hydrophilic polymers of the present embodiments can comprise at least one hydrophobically modified hydrophilic monomer and, optionally, at least one hydrophilic monomer. As such, the hydrophobically modified hydrophilic polymers of the present embodiments can be homopolymers, copolymers, terpolymers or higher order polymer structures. Positioning of the hydrophilic monomer units and the hydrophobically modified hydrophilic monomer units in copolymer and higher order polymer structures can vary without limitation and can be, for example, alternating, random, block or a combination thereof. Examples of suitable hydrophilic monomers include, for example, 2-acrylamido-2-methyl propane sulfonic acid, N,N-dimethylacrylamide, vinyl pyrrolidone, dimethylaminoethyl methacrylate, dimethylaminoethyl methacrylamide, acrylic acid, methacrylic acid, dimethylaminopropyl methacrylate, dimethylaminopropyl methacrylamide, trimethylammoniumethyl methacrylate halide (halide=chloride, bromide, iodide or a halide equivalent such as, for example, a tosylate or methanesulfonate), acrylamide, methacrylamide, and hydroxyethyl acrylate.

In some embodiments, hydrophobically modified hydrophilic polymers can be prepared by polymerizing at least one hydrophobically modified hydrophilic monomer or a mixture of at least one hydrophobically modified hydrophilic monomer and at least one hydrophilic monomer. Illustrative hydrophobically modified hydrophilic monomers include, for example, alkyl acrylates, alkyl methacrylates, alkyl acrylamides, alkyl methacrylamides, alkyldimethylammoniumethyl methacrylate bromide, alkyldimethylammoniumethyl methacrylate chloride, alkyldimethylammoniumethyl methacrylate iodide, alkyldimethylammoniumpropyl methacrylate bromide, alkyldimethylammoniumpropyl methacrylate chloride, alkyldimethylammoniumpropyl methacrylate iodide, alkyldimethylammoniumethyl methacrylamide bromide, alkyldimethylammoniumethyl methacrylamide chloride, alkyldimethylammoniumethyl methacrylamide iodide, alkyldimethylammoniumpropyl methacrylamide bromide, alkyldimethylammoniumpropyl methacrylamide chloride, and alkyldimethylammoniumpropyl methacrylamide iodide. In general, alkyl groups of the hydrophobically modified hydrophilic monomers contain about 4 to about 22 carbon atoms.

In some embodiments, the hydrophobically modified hydrophilic polymer comprises at least one alkyldimethylammoniumethyl methacrylate halide hydrophobically modified hydrophilic monomer. In such embodiments, the alkyl group comprises about 4 to about 22 carbon atoms. In such embodiments, the halide can be chloride, bromide, iodide, or a halide equivalent (e.g., toluenesulfonate or methanesulfonate), for example. In more specific embodiments, the alkyl group can be a cetyl group containing 16 carbon atoms. That is, in some embodiments, a cetyldimethylammoniumethyl methacrylate halide monomer unit can be polymerized to form the hydrophobically modified hydrophilic polymer, optionally with another hydrophilic monomer, or a dimethylaminoethyl methacrylate monomer unit in a hydrophilic polymer can be hydrophobically modified with an agent such as, for example, a cetyl halide or a cetyl halide equivalent.

In some embodiments, the RPM can be a hydrophobically modified hydrophilic polymer that comprises at least one monomer unit derived from a cetyldimethylammoniumethyl methacrylate halide. Such a RPM contains at least the following structural unit in its polymer backbone, where the wavy lines represent bonding to other monomer units.

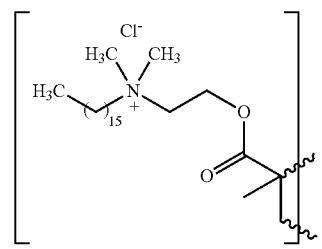

As noted above, RPMs containing this monomer unit can be homopolymers or copolymers or higher order polymer structures containing a hydrophilic monomer. For example, in one embodiment, a RPM can contain dimethylaminoethyl methacrylate and the above monomer unit derived from a cetyldimethylammoniumethyl methacrylate halide. This RPM is sold under the trade name "HPT-1" by Halliburton Energy Services of Duncan, Okla. Specific synthetic procedures and disclosure relating to this RPM are described in commonly owned U.S. Pat. No. 7,114,568, which is incorporated herein by reference in its entirety.

In various embodiments, the particulate material can be a sand or a gravel. As used herein, the term "sand" refers to a detrital grain material obtained from the breakdown or weathering of rocks that has a particulate size ranging between about 0.0625 mm and about 2 mm (approximately 230 mesh to 10 mesh). As used herein, the term "gravel" refers to a detrital grain material obtained from the breakdown or weathering of rocks that has a particulate size ranging between about 2 mm (10 mesh) and about 64 mm. Unless otherwise specified, use of the term "sand" herein will be understood to equivalently refer to both sand and gravel having particulate sizes residing within the above size ranges. It should be understood that the term "particulate," as used herein, includes all known shapes of materials including substantially spherical materials, fibrous materials, polygonal materials (such as, but not limited to, cubic materials) and mixtures thereof.

In some embodiments, the sand particulates can contain primarily silica ($SiO_2$), which is the primary constituent of most continental and coastal sands. In more specific embodiments, the sand can be a sand that is commonly used in the oilfield industry for various operations (e.g., as a proppant in fracturing operations). Such sands are commonly referred to in the art as frac sands. Illustrative frac sands include, for example, Oklahoma #1 sand, Ottowa white sands and Brady brown sands. One of ordinary skill in the art will recognize that the aforesaid listing of sands is merely illustrative and should not be considered limiting.

Frac sands can be obtained in a wide range of particulate sizes including 8/16, 12/20, 16/30, 20/40, 30/50, 30/70, 40/60, 40/70 and 100 mesh sizes. However, one of ordinary skill in the art will recognize that a given frac sand will contain a range of particulate sizes, and the aforesaid listing of mesh sizes should not be considered limiting. In some embodiments of the present invention, the sand has a particulate size ranging between about 20 mesh and about 200 mesh. In other embodiments, the sand has a particulate size ranging between about 30 mesh and about 140 mesh. In still other embodiments, the sand has a particulate size ranging between about 70 mesh and about 140 mesh or between about 70 mesh and about 100 mesh.

Particulate materials other than sand are also believed to be usable in the present embodiments, with such particulate materials having the same general range of particulate sizes. In some embodiments, such particulate materials can be a substance containing silica or silicates. For example, the particulate material can be a silica- or silicate-containing mineral. Illustrative silica- or silicate-containing minerals that are believed to be usable in place of or in combination with sand in the present embodiments include, for example, tectosilicates (e.g., quartz, feldspar and zeolites), phyllosilicates (e.g., clays and micas), inosilicates, cyclosilicates, sorosilicates and nesosilicates (orthosilicates).

In other various embodiments, the particulate material onto which the RPM is coated can be another type of particulate material that is commonly used in oilfield operations (e.g., as a proppant during fracturing operations). It is believed that such particulate materials can be used in place of or in combination with sand in the present embodiments. Illustrative particulate materials that are not based upon silica include, for example, bauxite, ceramic materials, glass materials, polymer materials, polytetrafluoroethylene materials, nut shell pieces, seed shell pieces, cured resinous particulates comprising nut shell pieces, cured resinous particulates comprising seed shell pieces, fruit pit pieces, cured resinous particulates comprising fruit pit pieces, wood, composite particulates and combinations thereof. Suitable filler materials in composite particulates include, for example, silica, alumina, fumed carbon, carbon black, graphite, mica, titanium dioxide, metasilicate, calcium silicate, kaolin, talc, zirconia, boron, fly ash, hollow glass microspheres, solid glass, and combinations thereof. Such filler materials can optionally be used as a particulate material in the present embodiments without forming a composite particulate.

In some embodiments described herein, sand can be pre-coated with a RPM and used in combination with particulate materials that are not coated with a RPM. Such particulate materials include those set forth above. In other embodiments, the sand can be pre-coated with a RPM and used in combination with another particulate material that has been pre-coated with a RPM. In still other embodiments, sand that is not coated with a RPM can be used in combination with another particulate material that has been pre-coated with a RPM. In still other embodiments, another particulate material that has been pre-coated with a RPM can be used in lieu of sand. In some embodiments, the RPM-coated particulates of the present invention can be combined in a treatment fluid and used in various subterranean operations, as described in further detail hereinbelow.

In various embodiments, the particulate material can be at least partially coated with the RPM. In some embodiments, the particulate material can be completely coated with the RPM. As used herein, a particulate material is coated completely with an RPM if there is at least a continuous monolayer of RPM coating on the particulate material, although more than one layer can be present in a continuous coating. In some embodiments, the particulate material can be partially coated with the RPM. When a partial coating is used, the particulate material can coat at least about 25% of the particulate material in some embodiments, or at least about 50% of the particulate material in some embodiments, or at least about 75% of the particulate material in some embodiments, or at least about 90% of the particulate material in some embodiments. In some embodiments, a partial coating of the RPM can be a partial monolayer coating (i.e., a discontinuous monolayer).

Depending on whether the particulate material has a full or partial coating of the RPM, the weight percentage of the RPM can vary over a considerable range. In various embodiments, a weight percentage of RPM coated on the particulate material can range between about 0.05% to about 10%. In other embodiments, a weight percentage of RPM coated on the particulate material can range between about 0.1% and about 6%. In still other embodiments, a weight percentage of RPM coated on the particulate material can range between about 0.075% to about 1%. In still other embodiments, a weight percentage of RPM coated on the particulate material can range between about 0.1% to about 0.5%.

The process for coating the RPM on the particulate material is not particularly limited. In some embodiments, a solution of the RPM can be combined with the particulate material, and the solvent can be removed thereafter to deposit the RPM on the particulate material. In some embodiments, removal of the solvent can be accomplished by at least one of heating, applying vacuum, or a like technique. In other embodiments, a solution of RPM can be sprayed onto the particulate material, with the solvent being removed thereafter. In some embodiments, coating of the RPM on the particulate material can take place without removal of a solvent. Specifically, in such embodiments, a solution or suspension of the RPM in a solvent can be stirred with the particulate material or passed through a sand screw. Thereafter, the RPM-coated particulate and the residual solvent can be added directly to a fracturing fluid or like treatment fluid. In illustrative but non-limiting embodiments, coating of the RPM on the particulate materials can take place by routine modifications of methods used for coating particulate materials with resins and tackifiers. Such methods are described in commonly owned U.S. Pat. Nos. 7,799,744, 7,216,711 and 7,063,151, each of which is incorporated herein by reference in its entirety.

In some embodiments, methods for using the RPM-coated particulates of the present invention in subterranean operations are disclosed herein. Such subterranean operations include, without limitation, fracturing operations, gravel packing operations, and a combination thereof (e.g., frac-pack operations). In such subterranean operations, the RPM-coated particulates are introduced into a treatment fluid and placed in at least a portion of a subterranean formation via methods known to one of ordinary skill in the art. Such treatment fluids can include a fresh water base fluid, an aqueous salt solution base fluid, and the like as described in further detail hereinabove.

In various embodiments, methods described herein include providing RPM-coated particulates that comprise a RPM pre-coated on a particulate material, and placing a treatment fluid comprising a base fluid and the RPM-coated particulates in at least a portion of a subterranean formation.

In some embodiments, the methods can further comprise performing a treatment operation in the portion of the subterranean formation such as, for example, a fracturing operation, a gravel packing operation, or a combination thereof. In some embodiments, the methods can further comprise forming a proppant pack or a gravel pack in the portion of the subterranean formation being treated.

In some embodiments, the treatment fluid can further comprise a companion polymer, such that the treatment fluid is operable to reduce the water permeability of a proppant pack or a gravel pack within the subterranean formation by more than through using the RPM alone. In some embodiments, the companion polymer can interact synergistically with the RPM and/or the particulate material in order to improve certain properties of the treatment fluid. In some embodiments, a synergistic interaction can be observed when the treatment fluid is operable to reduce the water permeability of the proppant pack or gravel pack by more than when the RPM is used alone, either when coated on the particulate material or when a like amount of RPM is used in a treatment fluid directly. In some embodiments, a synergistic interaction can be observed when the treatment fluid has at least one improved property over that of a treatment fluid not containing the companion polymer.

In some embodiments, methods described herein comprise providing RPM-coated particulates that comprise a RPM that comprises a hydrophobically modified hydrophilic polymer pre-coated on a particulate material; placing a treatment fluid comprising a base fluid, the RPM-coated particulates, and a companion polymer in at least a portion of a subterranean formation; and forming a proppant pack or a gravel pack within a fracture in the portion of the subterranean formation. The treatment fluid containing the companion polymer is operable to reduce the water permeability of the proppant pack or the gravel pack by more than through using the RPM alone.

In general, treatment fluids used in the present methods can reduce the water permeability of the proppant pack or the gravel pack by at least about 80%. In some embodiments, the treatment fluids can reduce the water permeability of the proppant pack or the gravel pack by at least about 90%, or at least about 95%, or at least about 97%, or at least about 98%, or at least about 99%. As one of ordinary skill in the art will appreciate with the benefit of the present disclosure, the water permeability reduction will depend at least upon the amount of RPM-coated particulates used in a particular subterranean operation, the identity and quantity of RPM coated on the particulate material, and, when used, the identity and quantity of companion polymer in the treatment fluid.

Measurement of the water permeability reduction of the proppant pack or the gravel pack can be determined by measuring the permeability reduction of a column packed with the RPM-coated particulates. Illustrative methods for determining the water permeability reduction of a subterranean formation core sample are described in U.S. Pat. No. 6,476,169, which is incorporated herein by reference in its entirety. Such methods for testing the water permeability of a core sample can be readily adapted by one of ordinary skill in the art to determine the water permeability of a proppant pack or a gravel pack within a laboratory setting. As with untreated subterranean core samples, uncoated particulate materials are considered to have no water permeability reduction.

The concentration of the companion polymer in the present treatment fluids is generally chosen such that an effective reduction in water permeability (e.g., at least about 80%) is obtained when treating a proppant pack or a gravel pack within a subterranean formation. Concentrations of the companion polymer are generally about 0.05% or below by weight in the treatment fluids of the present invention. In some embodiments, a concentration of the companion polymer is about 0.04% or below by weight in the treatment fluid, or about 0.03% or below by weight in the treatment fluid, or about 0.02% or below by weight in the treatment fluid, or about 0.01% or below by weight in the treatment fluid. In some embodiments, a concentration of the companion polymer can range between about 0.05% and 0.005% by weight in the treatment fluid. In other embodiments, a concentration of the companion polymer can range between about 0.025% and about 0.0075% by weight in the treatment fluid.

A number of different companion polymers can be used in the present embodiments in order to reduce the water permeability of a proppant pack or a gravel pack within a subterranean formation by more than is possible by when using the RPM alone, either coated on the particulate material or dispersed in a treatment fluid. In some embodiments, the companion polymer is not a hydrophobically modified polymer. As used herein, the term "not hydrophobically modified" refers to a base polymer that does not contain a hydrophobic modification thereon. As used herein, a hydrophobic modification of a base polymer will be considered to be any hydrophobic group having more than about 4 carbon atoms.

Illustrative examples of companion polymers suitable for use in the present embodiments include, for example, polyacrylates, polyacrylamides, acrylate/acrylamide copolymers, and acrylamide/diallyldimethyl ammonium chloride copolymers. In some embodiments, the companion polymer can be a biopolymer, particularly polysaccharides such as, for example, carboxymethylcellulose, guar, hydroxypropylguar, carboxymethylhydroxypropylguar, chitosan, diutans, xanthans, and dextrans.

In some embodiments, the companion polymer can comprise at least one of an acrylamide monomer unit or an acrylate ester monomer unit. In some embodiments, the companion polymer can contain a repeat unit derived from acrylamide. A portion of a companion polymer containing an acrylamide repeat unit is shown below, where the wavy lines represent bonding to other monomer units.

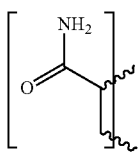

In some embodiments, the companion polymer can contain a repeat unit derived from an acrylate ester. A portion of a companion polymer containing an acrylate ester repeat unit is shown below, where the wavy lines represent bonding to other monomer units and R is an alkyl or aryl group, for example.

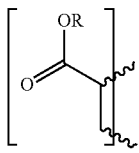

In some embodiments, the companion polymer can be at least one of a polyacrylamide, a polyacrylate, or an acrylate/acrylamide copolymer. In some embodiments, at least a portion of the side chains of such companion polymers can be hydrolyzed. That is, when the companion polymer contains acrylamide and/or acrylate ester repeat units, at least a portion of the side chain amides or carboxylic esters therein are hydrolyzed to the corresponding carboxylic acid. In such embodiments in which at least a portion of the side chains are hydrolyzed, at least a portion of the companion polymer contains acrylic acid monomer units. A partial structure of a companion polymer containing acrylic acid monomer units is shown below, where the wavy lines represent bonding to other monomer units (e.g., other acrylic acid monomer units and/or other acrylamide or acrylate ester monomer units).

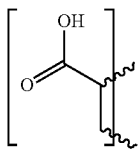

Depending on the pH, companion polymers having hydrolyzed side chains can be in their protonated (i.e., acidic) or deprotonated (i.e., anionic forms).

In some embodiments, the companion polymer can be a polyacrylamide, specifically a polyacrylamide in which at least a portion of the side chains are hydrolyzed. A number of partially hydrolyzed polyacrylamides are known in the art and are commercially available. Two commercially available polyacrylamides that are suitable for use in the present embodiments include, for example, "FR-66" and "FDP-835," each of which is available from Halliburton Energy Services of Duncan, Okla. "FR-66" is a partially hydrolyzed polyacrylamide having a molecular weight of at least about 10,000,000. "FDP-835" is a partially hydrolyzed polyacrylamide having a molecular weight of less than about 500,000. Hence, the molecular weight of the companion polymer can span a wide range in the present embodiments. In some embodiments, a molecular weight of the polyacrylamide can range between 100,000 and about 10,000,000 or between about 500,000 and about 10,000,000. Higher or lower molecular weights for a polyacrylamide companion polymer can also be suitable and lie within the spirit and scope of the present invention.

In some embodiments, the present methods include performing a treatment operation in the portion of the subterranean formation. Such treatment operations can include any operation in which particulates are deposited in a subterranean formation, for example, fracturing operations, gravel packing operations and combinations thereof (e.g., frac-packing operations). In some embodiments, such treatment operations can include depositing at least some of the RPM-coated particulates in the portion of the subterranean formation being treated. In some embodiments, deposition of the RPM-coated particulates can involve forming a proppant pack or a gravel pack within a fracture in the portion of the subterranean formation. As noted hereinabove, the deposition of the RPM-coated particulates into a desired zone of a subterranean formation can more effectively target the effects of the RPM in a treatment operation.

In some embodiments, treatment fluids of the present invention can further comprise at least one surfactant. Such surfactants include cationic surfactants, anionic surfactants, zwitterionic surfactants and non-ionic surfactants, numerous examples of each of which are known to one of ordinary skill in the art. When present, a surfactant can be used in the present treatment fluids at a concentration ranging between about 0.1% and about 2.0% by weight or between about 0.5% and about 1.0% in various embodiments.

Illustrative examples of surfactants can include, without limitation, ethoxylated nonyl phenol phosphate esters, alkyl phosphonates, linear alcohols, nonylphenol compounds, alkyoxylated fatty acids, alkylphenol alkoxylates, ethoxylated amides, ethoxylated alkyl amines, betaines, methyl ester sulfonates (e.g., as described in commonly owned U.S. Pat. Nos. 7,159,659; 7,299,874; and 7,303,019 and U.S. patent application Ser. No. 11/058,611, filed Feb. 2, 2005, the entire disclosures of which are incorporated herein by reference), hydrolyzed keratin (e.g., as described in commonly owned U.S. Pat. No. 6,547,871, the entire disclosure of which is incorporated herein by reference), sulfosuccinates, taurates, amine oxides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), modified betaines, alkylamidobetaines (e.g., cocoamidopropyl betaine) and quaternary ammonium compounds (e.g., trimethyltallowammonium chloride, trimethylcocoammonium chloride). Suitable surfactants can be used in a liquid or powder form.

In some embodiments, the treatment fluids can further include at least one anionic surfactant. Particularly preferred anionic surfactants can include for example, poly(ethylene oxide) sulfonates, poly(ethylene oxide) carboxylates, poly(ethylene oxide) sulfates, poly(propylene oxide) sulfonates, poly(propylene oxide) carboxylates and poly(propylene oxide) sulfates. Particularly suitable anionic surfactants can include, for example, "EMULSOGEN COL 100" and "EMULSOGEN LS 24N," each of which is a poly(ethylene oxide) anionic surfactant that is available from Clariant Corporation, and "EMCOL CNP 110," a poly(ethylene oxide) anionic surfactant that is available from Akzo Nobel Corporation. Use of such anionic surfactants to increase the stability of a treatment fluid are described in commonly owned U.S. patent application Ser. No. 12/956,569, filed Nov. 30, 2010, which is incorporated herein by reference in its entirety. In some embodiments, the treatment fluids can include at least one surfactant that is not an anionic surfactant, which can optionally be used in combination with the aforementioned anionic surfactants. In such embodiments, a non-limiting listing of surfactants suitable for use in combination with an anionic surfactant include amphoteric surfactants such as, for example, fatty acids having quaternized amine groups, betaines (e.g., cocoamidopropyl betaine, palmitamidopropyl betaine and lauryl betaine), glycinates and imidazolines. In some embodiments, a suitable amphoteric surfactant for use in combination with an anionic surfactant can be "HC-2," an amphoteric surfactant that is commercially available from Halliburton Energy Services of Duncan, Okla.

Further, the present treatment fluids can optionally comprise any number of additional additives commonly used in treatment fluids including, for example, clays, scale inhibitors, corrosion inhibitors, gelling agents, crosslinking agents, foaming agents, defoaming agents, antifoam agents, emulsifying agents, de-emulsifying agents, iron control agents, proppants or other particulates, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), lubricants, breakers, friction reducers, bridging agents, viscosifiers, weighting agents, solubilizers, pH control agents (e.g., buffers), hydrate inhibitors, consolidating agents, bactericides, biocides and the like. Combinations of these additives can be used as well.

To facilitate a better understanding of the present invention, the following examples of preferred embodiments are given. In no way should the following examples be read to limit, or to define, the scope of the invention.

EXAMPLES

Example 1

Brine Permeability Reduction Using Sand Coated with a Relative Permeability Modifier. A 122 gram portion of sand coated with variable amounts of "HPT-1" RPM was provided as indicated in Table 1 below. The sand was either Oklahoma #1 sand (100 mesh) or a 40/60 mesh sand. The sand was placed into a beaker, the HPT-1 was slowly added with a syringe, and the resulting mixture was then stirred with a spatula until it appeared to be evenly coated. To the RPM-coated sand was added a 2 L solution of a companion polymer in fresh water at the concentrations indicated in Table 1 below. The RPM-coated sand and the companion polymer solution were stirred together for 5 minutes, and the RPM-coated sand was then separated by decantation. Thereafter, the RPM-coated sand was collected on a Buchner funnel with Whatman #41 filter paper and air dried while pulling air through the filter paper. The RPM-coated sand was then packed in a 1" diameter tube having a length of 12", and an API brine solution was flowed through the tube to determine the brine permeability reduction. The brine permeability reduction was calculated relative to that of the corresponding uncoated sand (16,000 md for uncoated Oklahoma #1 100 mesh sand and 52,000 md for uncoated 40/60 mesh sand). Testing results are summarized in Table 1.

TABLE 1

| Entry # | HPT-1[a] Conc. on Sand (g HPT-1/g sand) | Particle Size (mesh) | Companion Polymer | Companion Polymer Conc. (wt. %) | Permeability Reduction (%) |
|---|---|---|---|---|---|
| 1 | 0.00098 | 100 | FR-66[b] | 0.025 | 99 |
| 2 | 0.0015 | 100 | FR-66 | 0.025 | 99 |
| 3 | 0.0025 | 40/60 | FR-66 | 0.025 | 98 |
| 4 | 0.0015 | 100 | CMC[c] | 0.24 | 99 |
| 5 | 0.0015 | 100 | HPG[d] | 0.18 | 53 |
| 6 | 0.0015 | 100 | CMHPG[e] | 0.24 | 99 |

[a]"HPT-1" is a hydrophobically modified hydrophilic polymer containing cetyldimethylammoniumethyl methacrylate halide units, which is available from Halliburton Energy Services of Duncan, Oklahoma.
[b]"FR-66" is a partially hydrolyzed polyacrylamide having a molecular weight of at least about 10,000,000 that is available from Halliburton Energy Services of Duncan, Oklahoma.
[c]CMC is carboxymethylcellulose.
[d]HPG is hydroxypropylguar.
[e]CMHPG is carboxymethylhydroxypropylguar.

As shown in Table 1, very good brine permeability reduction values were obtained when "HPT-1"-coated sand was treated with a low concentration of "FR-66" (entries 1-3). As shown below in the Comparative Examples, use of an equivalent amount of "HPT-1" in a treatment fluid, rather than being coated onto sand, produced a considerably lower reduction in brine permeability. Excellent brine permeability reduction values were also observed in the presence of other companion polymers (entries 4-6), although an order of magnitude higher concentrations of the companion polymers were used in the latter cases. HPG (entry 5) produced a lower brine permeability reduction value than did CMC (entry 4) or CMHPG (entry 6). In this example, HPG was used in a somewhat smaller concentration than were CMC or CMCHPG, and it is likely that if a higher concentration had been used, a comparable reduction in brine permeability would have been observed. It should be noted that these tests simulate downhole introduction of "HPT-1"-coated sand in a treatment fluid containing a companion polymer, followed by blocking of formation brine thereafter.

Example 2

Comparative Examples

Various control tests were run to demonstrate the desirable effects of combining a RPM pre-coated on sand with a companion polymer in a treatment fluid. Control testing results are summarized in Table 2. Testing was conducted as described above for EXAMPLE 1, except where modified as described below. When the companion polymer was omitted from the treatment fluid, no reduction in brine permeability was observed (entry 1). For this test, the RPM-coated sand was stirred with only fresh water for 5 minutes prior to testing the brine permeability. Use of only the companion polymer in the treatment fluid without any "HPT-1" being present on the sand also produced very poor brine permeabilities (entries 2 and 5).

Inclusion of the "HPT-1" in the treatment fluid with the companion polymer resulted in poorer brine permeability reduction values compared to those seen when a comparable amount of "HPT-1" was coated on sand (entries 3 and 4). For these examples, the companion polymer and the "HPT-1" were mixed in a 2% KC1 solution, rather than in fresh water, since the "HPT-1" precipitated from fresh water in the presence of "FR-66." For entry 3, the amount of "HPT-1" used was equivalent to that of entry 2 from Table 1. At equivalent amounts of "HPT-1," the brine permeability reduction was over 3-fold poorer when the "HPT-1" was in a base fluid with the companion polymer, rather than being coated on the sand. Increasing the solution concentration of "HPT-1" by approximately 13-fold (entry 4) produced a brine permeability reduction (99%) comparable to that of entry 2 from Table 1.

TABLE 2

| Entry # | HPT-1$^a$ Conc. on Sand (g HPT-1/g sand) | Particle Size (mesh) | Companion Polymer | Companion Polymer Conc. (wt. %) | HPT-1 Solution Conc. (wt. %) | Permeability Reduction (%) |
|---|---|---|---|---|---|---|
| 1 | 0.0015 | 100 | — | — | — | 0 |
| 2 | — | 100 | FR-66 | 0.025 | — | 0 |
| 3 | — | 100 | FR-66 | 0.025 | 0.009% | 33 |
| 4 | — | 100 | FR-66 | 0.025 | 0.12% | 99 |
| 5 | — | 100 | CMHPG | 0.24 | — | 4 |

Therefore, the present invention is well adapted to attain the ends and advantages mentioned as well as those that are inherent therein. The particular embodiments disclosed above are illustrative only, as the present invention may be modified and practiced in different but equivalent manners apparent to one of ordinary skill in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
    providing relative permeability modifier (RPM)-coated particulates that comprise a relative permeability modifier pre-coated on a particulate material, the relative permeability modifier comprising a hydrophobically modified hydrophilic polymer having an alkyl group containing about 4 to about 22 carbon atoms; and
    placing a treatment fluid comprising a base fluid and the RPM-coated particulates in at least a portion of a subterranean formation.

2. The method of claim 1, further comprising:
    performing a treatment operation in the portion of the subterranean formation, the treatment operation comprising at least one treatment selected from the group consisting of a fracturing operation and a gravel packing operation; and
    forming a proppant pack or a gravel pack in the portion of the subterranean formation.

3. The method of claim 2, wherein the treatment fluid further comprises a companion polymer, the treatment fluid reducing the water permeability of the proppant pack or the gravel pack by more than through using the relative permeability modifier alone.

4. The method of claim 3, wherein the treatment fluid reduces the water permeability of the proppant pack or the gravel pack by at least about 80%.

5. The method of claim 3, wherein the companion polymer is not hydrophobically modified.

6. The method of claim 5, wherein the companion polymer comprises at least one polymer selected from the group consisting of a polyacrylate, a polyacrylamide, an acrylate/acrylamide copolymer, a biopolymer, a polysaccharide, carboxymethylcellulose, hydroxypropylguar, and carboxymethylhydroxypropylguar.

7. The method of claim 5, wherein the companion polymer comprises at least one polymer selected from the group consisting of a polyacrylate, a polyacrylamide, and an acrylate/acrylamide copolymer; and
    wherein at least a portion of the side chains of the companion polymer are hydrolyzed.

8. The method of claim 3, wherein the base fluid comprises fresh water.

9. The method of claim 1, wherein the hydrophobically modified hydrophilic polymer comprises at least one monomer unit derived from a cetyldimethylammoniumethyl methacrylate halide.

10. The method of claim 1, further comprising:
    performing a treatment operation in the portion of the subterranean formation;
        wherein the treatment operation comprises at least one treatment selected from the group consisting of a fracturing operation and a gravel packing operation.

11. A method comprising:
    providing RPM-coated particulates that comprise a relative permeability modifier pre-coated on a particulate material;
        wherein the relative permeability modifier comprises a hydrophobically modified hydrophilic polymer, the hydrophobically modified hydrophilic polymer having an alkyl group containing about 4 to about 22 carbon atoms;
    placing a treatment fluid comprising a base fluid, the RPM-coated particulates, and a companion polymer in at least a portion of a subterranean formation; and
    forming a proppant pack or a gravel pack within a fracture in the portion of the subterranean formation;
        wherein the treatment fluid reduces the water permeability of the proppant pack or the gravel pack by more than through using the relative permeability modifier alone.

12. The method of claim 11, wherein the companion polymer interacts synergistically with the relative permeability modifier to reduce the water permeability of the proppant pack or the gravel pack.

13. The method of claim 11, wherein the treatment fluid reduces the water permeability of the proppant pack or the gravel pack by at least about 80%.

14. The method of claim 11, wherein the base fluid comprises fresh water.

15. The method of claim 11, wherein the companion polymer is not hydrophobically modified.

16. The method of claim 15, wherein the companion polymer comprises at least one polymer selected from the group consisting of a polyacrylate, a polyacrylamide, an acrylate/acrylamide copolymer, a biopolymer, a polysaccharide, carboxymethylcellulose, hydroxypropylguar, and carboxymethylhydroxypropylguar.

17. The method of claim 15, wherein the companion polymer comprises at least one polymer selected from the group consisting of a polyacrylate, a polyacrylamide, and an acrylate/acrylamide copolymer;
wherein at least a portion of the side chains of the companion polymer are hydrolyzed.

18. The method of claim 11, wherein the hydrophobically modified hydrophilic polymer comprises at least one monomer unit derived from a cetyldimethylammoniumethyl methacrylate halide.

19. The method of claim 11, wherein the particulate material comprises sand.

20. RPM-coated particulates comprising:
a coating comprising a relative permeability modifier coating on a particulate material, the relative permeability modifier comprising a hydrophobically modified hydrophilic polymer having an alkyl group containing about 4 to about 22 carbon atoms.

21. The RPM-coated particulates of claim 20, wherein the particulate material comprises sand.

22. The RPM-coated particulates of claim 20, wherein the hydrophobically modified hydrophilic polymer comprises at least one monomer unit derived from a cetyldimethylammoniumethyl methacrylate halide.

* * * * *